United States Patent [19]

Tatsumi et al.

[11] 3,889,031

[45] June 10, 1975

[54] COATED GLASS BOTTLES

[75] Inventors: Testujiro Tatsumi; Reiji Miyamoto, both of Chiba; Yutaka Matsui, Shizuoka; Seiji Kazama, Hyogo; Tadao Takemura, Nara; Hikoyoshi Kanayama, Chiba, all of Japan

[73] Assignees: Takeda Chemical Industries, Ltd., Osaka; Mitsui Polychemicals, Co., Ltd., Tokyo, both of Japan

[22] Filed: Oct. 26, 1972

[21] Appl. No.: 301,245

[30] Foreign Application Priority Data

Nov. 24, 1971  Japan.................. 46-94362

[52] U.S. Cl.................. 428/216; 215/DIG. 6; 428/425; 428/442; 215/1 R
[51] Int. Cl........ B41m 1/18; B44c 3/02; B44d 1/02
[58] Field of Search........... 117/72, 124 E; 215/1 R, 215/DIG. 6

[56] References Cited
UNITED STATES PATENTS

| | | | |
|---|---|---|---|
| 3,407,085 | 10/1968 | Kitaj et al. | 117/72 |
| 3,415,673 | 12/1968 | Clock | 117/72 |
| 3,554,787 | 1/1971 | Plymale | 117/72 |
| 3,734,765 | 5/1973 | Russell et al. | 117/124 E |
| 3,772,061 | 11/1973 | McCoy et al. | 117/72 |

*Primary Examiner*—David Klein
*Attorney, Agent, or Firm*—Wenderoth, Lind & Ponack

[57] ABSTRACT

Glass bottles having their surface initially coated with an olefine copolymer containing OH groups or OH and COOH groups and then coated with a polyisocyanate or mixture of a polyisocyanate and a polyol or thermoplastic polyurethane, such coated bottles exhibiting resistance to breakage.

7 Claims, 2 Drawing Figures

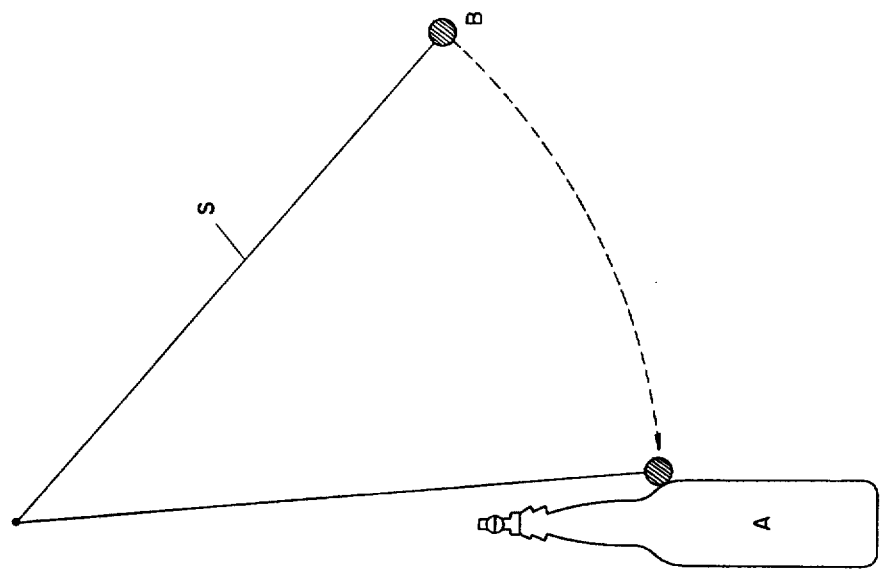

COATED GLASS BOTTLES

The present invention is concerned with coated glass bottles having excellent and improved properties.

Glass bottles have long been used in various fields, for example, as containers for beer, wine, whiskey, champagne, cola drinks, fruits juice, other soft drinks, etc., by virtue of their properties of high transparency, high resistance to chemicals, and no gas-permeability, etc. However, one fatal defect of glass bottles is low impact strength, and thus glass bottles are easily broken, and once broken, pieces of glass are scattered, Particularly, when glass bottles containing carbonated drinks such as beer, cola, etc., are broken, the scattering of glass pieces is rather explosive.

For the purpose of eliminating or reducing this defect, it has been proposed that the surface of glass bottles be coated with some kinds of synthetic resins such as polyethylene, ethylene-vinyl acetate copolymer, polyvinyl acetate, etc. However, in the glass bottles coated with such resins as mentioned just above, such characteristics are apt to be lost that are proper to "glass" itself, such as transparency, resistance to chemicals, particularly alkaline substances, etc. More particularly stating, when the glass bottles coated with such resins as above are subjected to a process for washing with an aqueous solution of a strong alkaline substance, this process being necessary in most cases before filling the bottles with a drink, the coated materials are degraded by the alkaline substance and finally peeled off or the transparency is almost completely lost. Further, many cracks and cuts are brought about on the surface of the coated bottles on their packing, filling, washing and other handling steps, and thus the appearance of them becomes very poor, and if the cracks or cuts are such as penetrating to the glass layer, they accelerate not only the peeling-off of the coated layer but also the breakage of the bottles.

Because of the defect as mentioned above, the coated bottles, which have hitherto been proposed, cannot be put into practical use even in one cycle, needless to say, in repeating cycles.

For the purpose of eliminating the defect of glass bottles, i.e., easy breakage by impact and scattering of glass pieces upon breakage, without sacrificing the characteristics proper to glass, i.e., transparency, resistance to chemicals, particularly alkaline substances, etc., the present inventors have made extensive studies. As the result of the studies, the present inventors found out that, when the breakage of glass bottles and scattering of glass pieces upon breakage are intended to be inhibited by coating the surface of the glass bottles with some kind of coating material, all of coating materials having high strength and high adhesiveness to glass are not always satisfactory to this purpose, but that some other factors are decisive therefor, though they are unknown and unclear.

Thus, taking this finding into consideration, the present inventors have made further studies for finding out a coating material desirably suitable for this purpose, and reached another finding that the afore-mentioned purpose can be attained by coating the surface of glass bottles with two different kinds of coating materials in a specific sequence, the coating material to be applied at first being an olefine copolymer containing OH and/or COOH groups in its molecule and that to be applied subsequently being a polyisocyanate or a mixture of a polyisocyanate and a polyol or a thermoplastic polyurethane.

Regarding the second coated layer, so-called alkyd resins, melamine resins, modified melamine resins, modified alkyd resins, and many other resins have been known as showing high hardness, high strength and high adhesion to glass, comparable with so-called polyurethane resins. However, in cases where the above resins are used as the second layer in the present invention, the object of the present invention cannot be attained, namely, scattering of glass pieces upon breakage cannot effectively be inhibited, and exceptionally only in cases where the above-specified isocyanate or polyurethane is used as the second layer, can the object of the present invention effectively be attained.

The present invention was accomplished on the basis of these findings.

Thus, the present invention relates to glass bottles the surface of which is coated at first with an olefine copolymer containing OH and/or COOH groups in its molecule and then with a polyisocyanate or a mixture of a polyisocyanate and a polyol or a thermoplastic polyurethane.

FIG. 2 represents a means for evaluating the break resistance of coated glass bottles.

Figure 1:
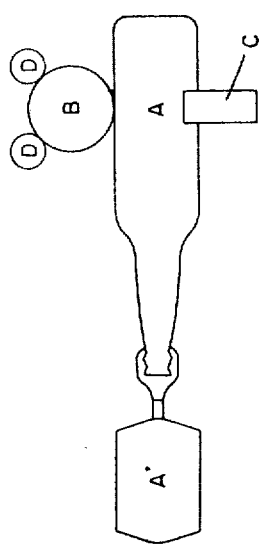
FIG. 1 represents three separate views of a means for evaluating the abrasion resistance of coated glass bottles.
Figure 1:
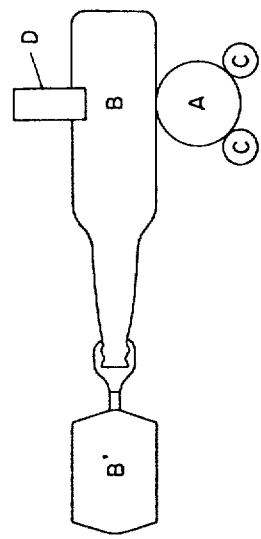
Figure 1:
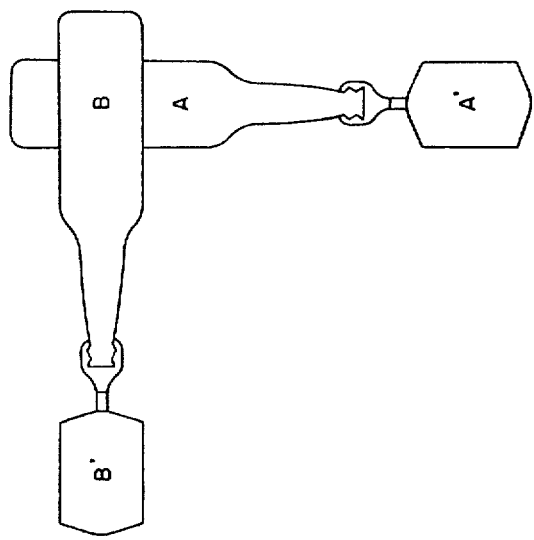

In the glass bottles of the present invention, breakage by impact can effectively be inhibited and even if broken, scattering of the broken glass pieces can be inhibited substantially completely, while the characteristics proper to glass are not sacrificed, that is to say, even after the glass bottles of the invention are subjected to processes for washing with alkaline substances, filling, packing, etc., there is found no cracks or cuts in the surface of the bottles and the transparency of the bottles is not reduced.

Therefore, the coated glass bottles of the present invention can be used repeatedly for containers of various kinds of drinks, especially carbonated drinks, without hazard of injury due to broken and scattered glass pieces and without causing a poor appearance of the containers.

Hereinafter is given a detailed explanation of the present invention.

According to the present invention, the surface of glass bottles is at first coated with an olefine copolymer containing OH and/or COOH groups in its molecule. The glass bottles employed in this invention may be any of conventional ones.

The olefine copolymers containing OH and/or COOH groups in their molecule include copolymers containing repeating units of (a)

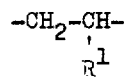

(wherein $R^1$ is hydrogen or a lower alkyl for example methyl or ethyl), (b)

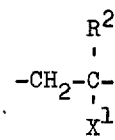

(wherein $R^2$ is hydrogen or methyl, $X^1$ is —OH, —COO(CH$_2$)$_n$—OH in which $n$ is 1 to 3) and (c)

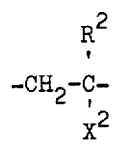

(wherein $R^2$ has the same meaning as above and $X^2$ is —OCOR$^3$ or —COOR$^4$ in which $R^3$ and $R^4$ are a lower alkyl for example of 1 to 4 carbon atoms). These copolymers are desirably those having a melt index of about 0.5 to about 1,000(g/10 min), more preferably about 50 to about 500 g/10 min). The total amount of the above repeating units of (b) and (c) in the copolymers is about 1 to about 50 mole percent, more preferably about 5 to about 20 mole percent, and an amount of the repeating unit (b) is about 50 to about 100 mole percent, more preferably about 55 to about 95 mole percent, relative to the total amount of the repeating units (b) and (c).

When these copolymers contain —COOH groups, they may be in a state of metal salt or so-called ionic copolymer ionized by neutralization with a metal. The metal includes mono-, di- and trivalent ones in Groups I, II, III, IV-A and VIII of the Periodic Table of Elements, such as Na, K, Li, Cs, Ag, Cu, Mg, Ca, Ba, Cd, Sn, Pb, Fe, Co, Ni and Zn.

These copolymers may be prepared, for example, by the following methods;

(1) (i) a lower α-olefine of the formula CH$_2$=CHR$^1$ (wherein R$^1$ has the same meaning as above) such as ethylene, propylene, butylene, etc., is copolymerized with (ii) acrylic acid, methacrylic acid, or hydroxy-lower alkyl (e.g., hydroxymethyl, hydroxyethyl, hydroxypropyl, etc.) acrylate or methacrylate. A molar ratio of (i)/(ii) is about 99/1 to about 50/50, more preferably about 95/5 to about 80/20. Five to 50 mole percent of the monomer (ii) may be replaced by a monomer of the general formula

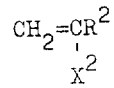

(wherein R$^2$ and X$^2$ have the same meaning as above), which is exemplified by vinyl acetate, vinyl propionate, vinyl butylate, acrylic or methacrylic acid lower alkyl esters (methyl, ethyl, propyl, butyl esters, etc.) and so on.

(2) a lower α-olefine as mentioned in the above (1) is copolymerized with a compound of the general formula

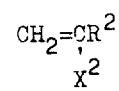

(wherein R$^2$ and X$^2$ have the same meaning as above), whose typical examples are as mentioned above (1), and the resulting copolymer is hydrolyzed partially or completely. A molar ratio of the two monomers to be used falls within the same range as defined in the above (1). The degree of hydrolysis is about 50 to about 100 mole percent, more preferably about 55 to about 95 mole percent, relative to the groups shown by the symbol X$^2$.

For better understanding, the preparation of some of these copolymers is illustrated below:

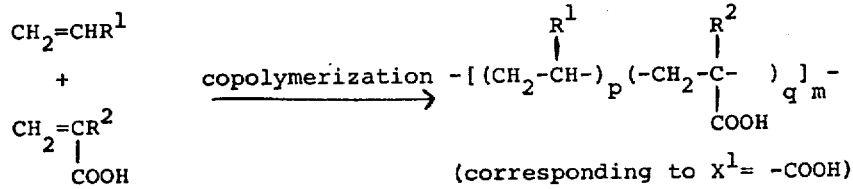

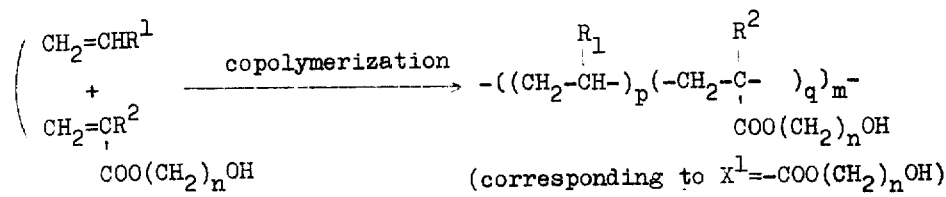

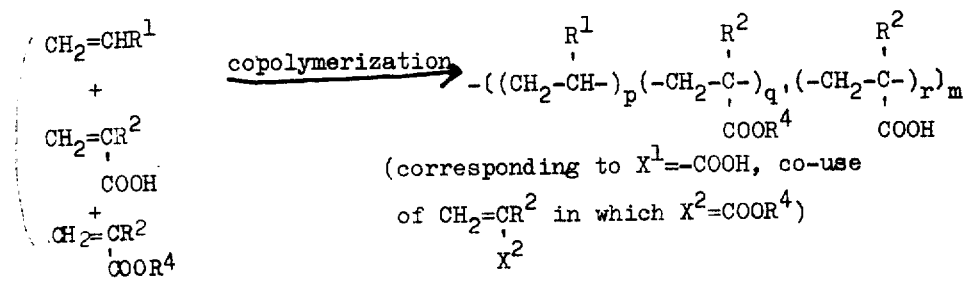

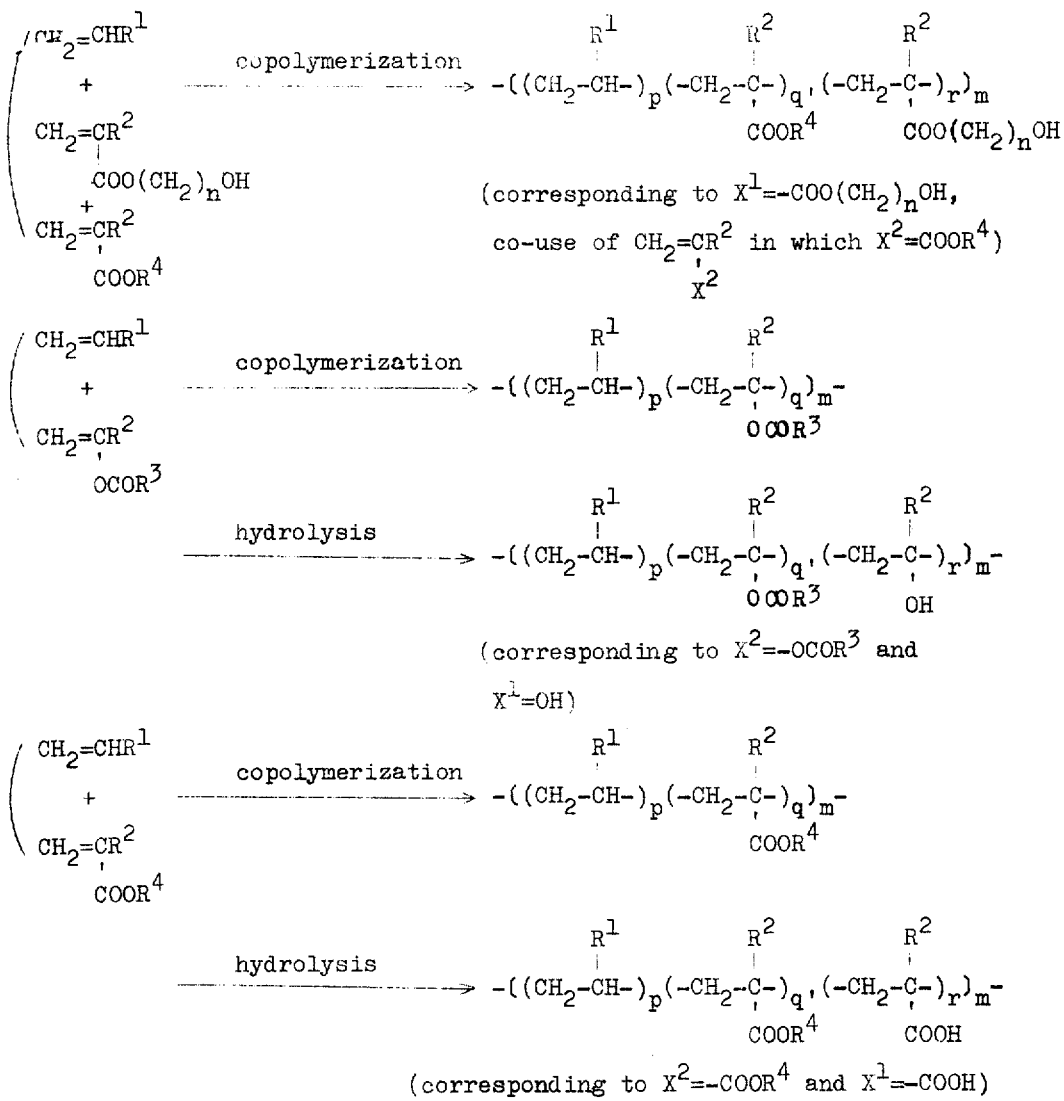

In the above, p/q is about 99/1 to about 50/50 (mol/mol), more preferably about 95/5 to about 60/40 (mol/mol), $q' + r = q$, and $100 \times r/(q'+r)$=about 50 to about 100, more preferably about 55 to about 95, and m is polymerization degree, which is adjusted so as to make the melt index of the copolymer about 0.5 to about 1,000(g/10 min), more preferably about 20 to about 500 (g/10 min), and generally falls within a range of about 5 to about 600, more preferably about 30 to about 400.

The detailed and concrete techniques and conditions for preparation of these copolymers may be any of conventional ones, for example, those described in U.S. Pat. Nos. 2,200,429, 2,703,794; 2,386,347, etc.

The metal salt and ionic copolymers can be prepared from the above-mentioned copolymers in a conventional manner. In regard to preparation of the ionic copolymers, U.S. Pat. No. 3,264,272, for example, is cited as a literature reference.

Among these olefine copolymers, desirable are hydrolyzed olefine/vinyl acetate copolymers, olefine/methacrylic acid copolymers, partially hydrolyzed olefine/acrylic acid ester copolymers, partially hydrolyzed olefine/methacrylic acid ester copolymers, etc., particularly hydrolyzed olefine (e.g., ethylene, propylene, butylene, etc., especially ethylene)/vinyl acetate copolymers whose hydrolysis degree is about 5 to about 100 mole percent, more preferably about 55 to about 95 mole percent.

Coating the surface of the glass bottles with the olefine copolymer is conducted in a conventional manner. For example, into a powdery olefine copolymer fluidized by air or other inert gas is dipped a glass bottle which is previously heated at higher than the softening point of the copolymer; the powdery copolymer is adhered to the surface of a glass bottle by means of electrostatic coating technique and then melted by heating at higher than the softening point of the copolymer; into a solution of the copolymer in a suitable solvent (e.g., toluene, butyl acetate, cellosolve acetate, etc.) is dipped a glass bottle or the solution is applied on the surface of a glass bottle, followed by drying. Thickness of the thus coated copolymer layer is more than about 50 microns, more preferably about 100 to about 500 microns.

Then, the thus coated glass bottle is further coated with (1) a polyisocyanate, (2) a mixture of a polyisocyanate and a polyol, or (3) a mixture of a polyisocyanate and a thermoplastic polyurethane.

The polyisocyanate usable includes organic polyisocyanates containing two or more, desirably 2 to 8, NCO groups per molecule, such as tolylene diisocyanate (TDI), ω,ω'-diisocyanate dimethylbenzene (XDI), hexamethylene diisocyanate (HMDI), diphenylmethane diisocyanate (MDI), ω,ω'-diisocyanate dimethylcyclohexane ($H_6$XDI), isophorone diisocyanate, dicyclohexylmethane diisocyanate ($H_{12}$ MDI), etc., and polyurethane polyisocyanates which are prepared by reacting an excess amount of the above-mentioned polyisocyanate and a low molecular polyol having molecular weight of about 60 to about 2,000, such as ethylene glycol, propylene glycol, butylene glycol, glycerine, trimethylolpropane, pentaerythritol, sorbitol, sucrose, polyoxyalkylene polyols, polyester polyols, etc. The polyol usable is that containing 2 to 20 hydroxy groups per molecule and having a molecular weight of about 300 to about 20,000, more preferably about 500 to about 10,000, such as polyether polyols which are prepared by reacting an alkylene oxide (e.g., ethylene oxide, propylene oxide, butylene oxide, etc.) with a polyol having 2 to 8 hydroxy groups per molecule, such as ethylene glycol, propylene glycol, butylene glycol, glycerine, pentaerythritol, trimethylol propane, sorbitol, sucrose, etc., polyester polyols which are prepared by reacting a polyol as mentioned above with a polycarboxylic acid (e.g., adipic acid, sebacic acid, maleic acid, etc.), acryl polyols which are prepared by homopolymerization of hydroxyalkyl acrylate (e.g., hydroxyethyl acrylate, hydroxymethyl acrylate, etc.) or hydroxyalkyl methacrylate (e.g., hydroxymethyl methacrylate, hydroxy ethyl methacrylate, etc.) or copolymerization of the hydroxyalkyl acrylate or hydroxyalkyl methacrylate with a vinyl monomer (e.g., styrene, vinyl chloride, vinyl acetate, acrylic acid esters, methacrylic acid esters, acrylonitrile, etc.)

The thermoplastic polyurethane usable is that having a molecular weight of about 3,000 to about 200,000, more preferably about 5,000 to about 100,000, which is prepared by reacting an organic diisocyanate (e.g., TDI, XDI, MDI, HMDI, $H_6$XDI, $H_{12}$MDI and the like) with a low molecular diol (e.g., ethylene glycol, diethylene glycol, propylene glycol, dipropylene glycol, butylene glycol, hexylene glycol, etc.) or a polyether diol prepared by reacting the above diol with an alkylene oxide or a polyester diol prepared by reacting the above diol with a dicarboxylic acid (e.g., adipic acid, succinic acid, sebacic acid, etc.) at a ratio of NCO/OH being around 1/1 (mol/mol).

When a mixture of the polyisocyanate and the polyol is used, amounts of these compounds are adjusted so as to make a ratio of NCO/OH (mol/mol) about 1.0 to about 2.0.

When a mixture of the polyisocyanate and the thermoplastic polyurethane is used, an amount of the polyisocyanate is about 2 to about 50 weight parts, more preferably about 5 to about 30 weight parts, relative to 100 weight parts of the thermoplastic polyurethane.

The polyisocyanate may be in the form of a blocked polyisocyanate. The blocked polyisocyanate is prepared by reacting the above-mentioned polyisocyanate with a blocking agent.

As an example of the isocyanate blocking agent contemplated in the present invention, there are employed those known materials, such as various phenolic compounds, for example, phenol, thiophenol, chlorophenol, methyl thiophenol, ethyl phenol, ethyl thiophenol, nitrophenol, cresol, xylenol or resorcinol; alcohols such as ethanol, methanol, propanol, isopropanol, butanol, tert-butanol, tert-pentanol, tert-butanethiol or tert-hexanol or derivatives thereof such as ethylene chlorohydrine, ω-hydroperfluoroalcohols or 1,3-dichloro-2-propanol; aromatic amines such as diphenylamine, diphenyl naphthyl amine or xylidine; imides such as succinic acid imide or phthalic acid imide; active methylene compounds such as acetoacetic acid esters, acetyl acetone or malonic acid diesters; mercaptans such as 2-mercapto benzo-thiazol or tert-dodecyl mercaptan; lactams such as ε-caprolactam, δ-valerolactam, γ-butyrolactam or β-propyllactam, imines such as ethylene imine, urea compounds such as urea, thiourea or diethylene urea, oximes such as acetoxime, methylethyl-ketone oxime, or cyclohexanone oxime, diaryl compounds such as carbazole, phenyl naphthyl amine or N-phenyl xylidine, bisulfates and borates. Of these blocking agents, phenolic compounds and ethanol are preferable. The blocked isocyanate compounds of the present invention may be readily prepared in a known manner, for example, by reacting a polyisocyanate compound with an equivalent or a slightly excess amount of an isocyanate blocking agent in the presence or absence of a solvent having no active hydrogen atom, such as ketones, esters or aromatic hydrocarbons at room temperature or about 40° to about 120°C.

Coating with the polyisocyanate component can be conducted in a conventional manner. For example, into a solution of the polyisocyanate component in a suitable organic solvent (e.g., ethyl acetate, butyl acetate, methylethyl ketone, methylisobutyl ketone, methyl acetate, cellosolve, cellosolve acetate, etc.) is dipped a glass bottle, or the solution is applied on the surface of a glass bottle, followed by drying. Thickness of the polyisocyanate component layer is about 2 to about 50 microns, more preferably about 4 to about 20 microns. The coating may be conducted at a room temperature or under heating at 50° to 200°C, or after completion of the coating process, the glass bottle may further be heated at 50° to 180°C.

When the polyisocyanate is used in a form of a blocked polyisocyanate, the coating is conducted at higher than the regenerating temperature of the blocked polyisocyanate, generally falling within a range of about 170° to about 200°C., or after coating process, the bottle is heated at the temperature as mentioned just above.

The present invention is applicable to various kinds of glass bottles such as those for carbonated drinks (e.g., beer, champagne, cola drinks, carbonated water, etc.) lowboiling liquid chemicals (e.g., ether, benzin, etc.), and the like.

In the following Examples and Control and tests, the word "part" means "weight part" unless otherwise noted, and relation between weight part and "volume part" is the same as between "gram" and "milliliter".

Control

A copolymer of ethylene and vinyl acetate (vinyl acetate content: 28 weight percent, molecular weight: about 10,000) is hydrolyzed by methanolic solution of sodium hydroxide to give a fine powdery (100 mesh pass) partially hydrolyzed copolymer (90 percent of the acetoxy groups in the original copolymer is hydrolyzed. Melt index: 190, Melting point: 90°C).

About 20 parts of the partially hydrolyzed copolymer is adhered to the surface of a glass bottle for beer (633 ml. capacity, weight: 580 g, wall thickness, 3–4 mm) by means of electrostatic adhesion technique, which is previously heated at 200°C, and then the bottle is further heated at 200°C for 10 minutes, whereby the surface of the glass bottle is coated with a copolymer layer of 100 microns in thickness.

The thus coated layer, however, has only poor strength, and when two coated glass bottles are lightly rubbed with each other, many scratches are caused on the coated layers.

EXAMPLE 1

The coated glass bottle prepared in the control is immersed in ethyl acetate solution containing 20 weight percent of tolylene diisocyanate (a mixture of 80 weight percent of 2,4-isomer and 20 weight percent of 2,6-isomer) and 0.2 weight percent of triethylamine at 50°C for 5 minutes, and washed with methanol and dried. Thus, a coated layer of the polyisocyanate component of 5 microns in thickness is formed on the surface of the above glass bottle. Thus treated glass bottle shows substantially the same transparency with a non-coated glass bottle, and no scratch is brought about even when two glass bottles are strongly rubbed with each other.

EXAMPLE 2

A copolymer of vinyl acetate and ethylene (vinyl acetate content: 40 weight percent, molecular weight: about 8,000) is hydrolyzed in a similar manner to the control to give partially hydrolyzed copolymer (85 percent of the acetoxy groups in the original copolymer is hydrolyzed. Melt index: 35, Melting point: 93°C). By the use of this partially hydrolyzed copolymer, a glass bottle for beer (633 ml. capacity, weight: 580 g, wall thickness: 3–4mm) is coated after the same manner as in the control, and then thus coated glass bottle is further subjected to the same coating treatment with Example 1. Thickness of the copolymer layer is 300 microns, and that of the polyisocyanate component layer is 4 microns.

EXAMPLE 3

A coated glass bottle as obtained in the control is further immersed in an ethyl acetate solution containing 20 weight percent of 4,4-diphenylmethane diisocyanate and 0.2 weight percent of triethylamine at 50°C for 10 minutes, washed with methanol and dried. Thickness of the polyisocyanate component layer is 7 microns.

EXAMPLE 4

A coated glass bottle as prepared in the control is further immersed in an ethyl acetate solution containing 20 weight percent of $\omega,\omega'$-diisocyanate-1,4-dimethylbenzene and 0.02 weight percent of dibutyltin dilaurate at 50°C for 10 minutes, washed with methanol and dried, Thickness of the polyisocyanate component layer is 4 microns.

EXAMPLE 5

A coated glass bottle as prepared in the control is further immersed in an ethyl acetate solution containing 0.1 weight percent of triethylenediamine and 40 weight percent of TDI (a mixture of 80 weight percent of 2,4-isomer and 20 weight percent of 2,6-isomer)-trimethylol propane adduct (NCO content of the solution: 13.5 percent) at 65°C for 20 minutes, washed with ethyl acetate, and dried. Thickness of the polyisocyanate component layer is 5 microns.

EXAMPLE 6

A glass bottle for beer (capacity: 633 ml, weight: 580g, wall thickness: 3–4mm) is coated with powdery copolymer of methacrylic acid and ethylene (content of methacrylic acid component: 15 weight percent, molecular weight: about 8,000) after the same manner as in the control, and then further coated with a polyisocyanate component after the same manner as in Example 1. Thickness of the copolymer layer is 200 microns, and that of the polyisocyanate component is 4 microns.

EXAMPLE 7

A glass bottle as prepared in the control is further immersed in a mixture of 1,324 parts of ethyl acetate, 96 parts of 75 weight percent ethyl acetate solution of TDI-trimethylol propane adduct (NCO content of the solution is 13.5 weight percent) and 100 parts of 80 weight percent butyl acetate solution of a polyester polyol prepared from adipic acid, phthalic acid and trimethylol propane (hydroxy number: 139) at 40°C for 2 minutes, and further heated at 80°C for 20 minutes. Thickness of the polyisocyanate component layer is about 8 microns.

The thus obtained bottle shows substantially the same transparency with a non-coated glass bottle, and no scratch is caused even when two coated glass bottles are strongly rubbed with each other.

EXAMPLE 8

A glass bottle as prepared in the control is further immersed in a mixture of 606 parts of ethyl acetate, 31.7 parts of 75 weight percent ethyl acetate solution of $\omega,\omega'$-diisocyanate-1,4-dimethylbenzene trimethylol propane adduct (NCO content of the solution is 11.5 weight percent), and 100 parts of 50 weight percent ethyl acetate-toluene solution of acryl polyol having hydroxy number of 40, which is prepared by copolymerization of 30.5 weight percent of methyl methacrylate, 18.5 weight percent of 2-hydroxyethyl methacrylate and 51 weight percent of styrene, at 40°C for 2 minutes, and further heated at 80°C for 20 minutes. Thickness of the polyisocyanate component layer is about 10 microns.

EXAMPLE 9

A coated glass bottle as obtained in the control is further immersed in a mixture of 85 parts of methylethyl ketone, 14 parts of 25 weight percent methylethyl ketone solution of a linear polyurethane having molecular weight of about 10,000, which is prepared by reacting TDI (a mixture of 80 parts of 2,4-isomer and 20 parts of 2,6-isomer) with polypropylene glycol (molecular weight of 400) in a molar ratio of NCO/OH of about 1/1, and 1 part of TDI (a mixture of 80 parts of 2,4-isomer and 20 parts of 2,6-isomer) at 30°C for 3 minutes, and heated at 50°C for 20 minutes. Thickness of the polyurethane component layer is about 9 microns. Thus obtained glass bottle shows substantially the same transparency and gloss as in a non-treated (non-coated) glass bottle, and no scratch is caused even when two glass bottles are strongly rubbed with each other.

EXAMPLE 10

A coated bottle as obtained in Example 1 is further immersed in a mixture of 85 parts of methylethyl ketone, 12 parts of the same linear polyurethane solution as in Example 9 and 3 parts of the same TDI-trimethylol propane solution as in Example 5 at 40°C for 2 minutes, and heated at 80°C for 15 minutes. The thus formed layer is about 12 microns in thickness.

The glass bottle thus prepared shows excellent transparency and gloss, and there is caused no scratch even when two glass bottles are strongly rubbed with each other.

EXAMPLE 11

The same procedure as in Example 10 is applied except for using the same XDI-trimethylol propane adduct solution as in Example 8 in place of the TDI-trimethylol propane adduct solution.

For the purpose of evaluation of the coated glass bottles obtained in the foregoing Control and Examples, the following two tests are conducted.

1. Abrasion resistance test

The test is conducted as illustrated in the FIG. 1. One glass bottle laid sideways (B) is placed on the other glass bottle also laid sideways (A) at an angle of 90°. The two bottles (A) and (B) are connected with motors (A') and (B'), respectively. The lower bottle (A) is sustained by rotary rubber rollers (C), while the upper bottle (B) is contacted with the lower bottle by its dead weight. Two other rotary rubber rollers (D) are placed on the upper portions of the upper bottle (B) so as to inhibit shift of the bottle (B). The load for the test can be increased freely by charging the bottle (B) with a suitable amount of water or other liquid. The two bottles (A) and (B) are rotated by the motors (A') and (B') at a pre-determined speed, whereby the two bottles are abraded with each other.

The coated glass bottles prepared in the control and Examples are tested in the foregoing manner at 60 rounds per minute under the loads of 600; 1,200 and 1,800 g., and after 10, 100 and 1,000 rounds, the scratches are observed by the naked eye.

The result is summarized in the Table 1.

Table 1

| Bottle   |    | Load of bottle (B) | Number of rounds | Abrasion* |
|----------|----|-------------------|-----------------|-----------|
| Control  |    | 600 (g)           | 10              | +++       |
| Example  | 1  | 1800              | 1000            | −         |
|          | 2  | 1800              | 1000            | −         |
|          | 3  | 1800              | 1000            | +         |
|          |    | 1200              | 100             | −         |
|          | 4  | 1200              | 100             | −         |
|          | 5  | 1200              | 100             | +         |
|          |    | 600               | 100             | −         |
|          | 6  | 1800              | 1000            | −         |
|          | 7  | 1200              | 100             | +         |
|          |    | 600               | 1000            | −         |
|          | 8  | 1200              | 100             | +         |
|          |    | 600               | 1000            | −         |
|          | 9  | 1800              | 1000            | +         |
|          |    | 1200              | 1000            | −         |
|          |    | 600               | 1000            | −         |
|          | 10 | 1800              | 1000            | +         |
|          |    | 600               | 1000            | −         |
|          | 11 | 1000              | 1000            | +         |
|          |    | 600               | 1000            | −         |

*−: no scratch is observed.
+: only a slight scratch is observed.
+++: significant scratches are observed.

As is clear from the above, in the bottle of the control, there are observed significant abrasions only after 10 rounds under a load of 600 g, while in the bottles of Examples there is observed no or only a slight abrasion even after 100 to 1,000 rounds under higher loads than above.

2. Break resistance test

The test is conducted as illustrated in the FIG. 2. A glass bottle (A) to be tested is charged with 500 volume parts of water, and compressed air is introduced therein until the inner pressure is increased up to 3 kg/cm$^2$, followed by sealing. A steel ball (500 g. weight) (B) hung on a string (S) (5 m length) is struck against the shoulder of the bottle (A) at a head of 60 cm. so as to break the bottle. Number of glass pieces which are broken and scattered and the maximum scattering distance of the pieces are measured. The result is summarized in Table 2.

Table 2

| Test bottle | Maximum scattering distance (m) | Number of glass pieces which are broken and scattered. |
|---|---|---|
| Non-coated bottle | 8 to 12 | 10 to 20 |
| Control | 6 to 8 | 5 to 10 |
| Example 1 | 1 to 2 | 2 to 5 |
| 2 | broken but not scattered | |
| 3 | 2 to 4 | 3 to 8 |
| 4 | 1 to 4 | 3 to 6 |
| 5 | 3 to 7 | 4 to 7 |
| 6 | 1 to 3 | 2 to 4 |
| 7 | 2 to 4 | 2 to 5 |
| 8 | 2 to 5 | 3 to 5 |
| 9 | 2 to 3 | 2 to 4 |
| 10 | 3 to 5 | 3 to 6 |
| 11 | 2 to 4 | 2 to 5 |

As is clear from the above, in the glass bottles of Examples, scattering of the broken glass pieces can effectively be inhibited, while in the glass bottle of the Control, inhibition of the scattering is not satisfactory.

Examples 12-18

In a similar manner to the foregoing Examples, a glass bottle for beer (633 ml. capacity, weight: 580g, wall thickness: 3-4mm) is coated at first with a base resin composition and then with a top coating composition as in such combinations as described below;

Base resin compositions a. 60 mole percent hydrolyzed product of a copolymer of 70 parts of ethylene with 30 parts of methylacrylate (melt index 240 g/10 min.)

b. Ionic copolymer of ethylene with methacrylic acid, which is ionized by neutralization with Zn$^{++}$ (manufactured and sold by E. I. du Pont de Nemours & Co. Inc. under registered trade name "Surlyn A 1650", specific gravity of 0.95, softening point of 75°C and melt index of 2 g/10 min.).

c. A copolymer of 50 parts of methyl methacrylate, 30 parts of butyl acrylate and 20 parts of β-hydroxyethyl methacrylate (melt index 350 g/10 min.).

d. The hydrolyzed vinyl acetate/ethylene copolymer in Example 2.

Top coating compositions

| | | |
|---|---|---|
| (i) | 10 percent toluene solution of $H_6XDI$ | |
| (ii) | A mixture of | |
| | $H_6XDI$ whose NCO groups are blocked with methyl ethyl ketoxime | 6 parts |
| | the same acryl polyol as in Example 8 | 2 parts |
| | Cellosolve acetate | 92 parts |
| | tetra-n-butyl diacetoxy distannoxane | 0.1 part |
| (iii) | A mixture of | |
| | XDI whose NCO groups are blocked with methanol | 10 parts |
| | Cellosolve acetate | 90 parts |
| | tetra-n-butyl diacetoxy distannoxane | 0.1 part |
| (iv) | A mixture of | |
| | $H_{12}MDI$ whose NCO groups are blocked with Cellosolve | 10 parts |
| | cellulose acetate butyrate | 2 parts |
| | Cellosolve acetate | 88 parts |
| | tetra-n-butyl diacetoxy distannoxane | 0.1 part |
| (v) | The same XDI solution as in Example 4 | |

| Example No. | Base resin composition | Top coating composition |
|---|---|---|
| 12 | (a) | (V) |
| 13 | (b) | (V) |
| 14 | (c) | (V) |
| 15 | (d) | (i) |
| 16 | (d) | (ii) |
| 17 | (d) | (iii) |
| 18 | (d) | (iv) |

The glass bottles treated as in these Examples 12–18 are subjected to the same tests as above. There is found no scratch under load of 1,200 g. even after 1,000 rounds, and substantially the same break resistance is observed.

What we claim is:

1. A glass bottle, the surface of which has been initially coated with an olefine copolymer containing repeating units of (a)

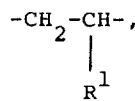

wherein $R^1$ is hydrogen or lower alkyl, (b)

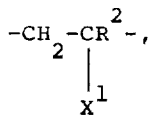

wherein $R^2$ is hydrogen or methyl, and $X^1$ is —OH or —COO(CH$_2$)$_n$OH in which $n$ is 1 to 3 and (c)

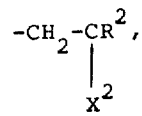

wherein $R^2$ has the same meaning as above and $X^2$ is —OCOR$^3$ or —COOR$^4$ in which $R^3$ and $R^4$ are lower alkyl, the total amount of the repeating units (b) and (c) in the copolymer being about 1 to about 50 mole percent, and the amount of the repeating unit (b) being about 50 to about 100 mole percent relative to the total amount of the repeating units (b) and (c), such copolymer showing a melt index of about 0.5 to about 1,000 g/10 min, and then subsequently coated with a polyisocyanate, a mixture of polyisocyanate and a polyol or a mixture of a polyisocyanate and a thermoplastic polyurethane.

2. A glass bottle as claimed in claim 1, wherein the olefine copolymer is a hydrolyzed product of a copolymer of an α-olefine having 2 to 4 carbon atoms with vinyl acetate, the degree of hydrolysis being about 5 to about 100 mole percent.

3. A glass bottle as claimed in claim 1, wherein the polyisocyanate is an organic polyisocyanate containing 2 to 8 NCO groups per molecule.

4. A glass bottle as claimed in claim 1, wherein the polyisocyanate is tolylene diisocyanate, ω,ω'-diisocyanate dimethylbenzene, dicyclohexylmethane diisocyanate, or ω,ω'-diisocyanate dimethyl cyclohexane, or a polyurethane polyisocyanate which is prepared by reacting an excess amount one of the said diisocyanates with a low molecular polyol containing 2 to 8 OH groups per molecule and having a molecular weight of about 60 to about 2,000.

5. A glass bottle as claimed in claim 1, wherein the polyol is a low molecular polyol which contains 2 to 8 OH groups per molecule and has a molecular weight of about 60 to about 2,000.

6. A glass bottle as claimed in claim 1, wherein the thermoplastic polyurethane has a molecular weight of about 3,000 to about 20,000, and is prepared by reacting an organic diisocyanate, with a low molecular diol having a molecular weight of about 60 to about 2,000 at a molar ratio of NCO/OH of about 1/1.

7. A glass bottle as claimed in claim 1, wherein the initial coating has a thickness of about 50 to about 500 microns, and the subsequent coating has a thickness of about 2 to about 50 microns.

* * * * *